B. W. McClure,
Horse Collar Block,
No. 44,642. Patented Oct. 11, 1864.
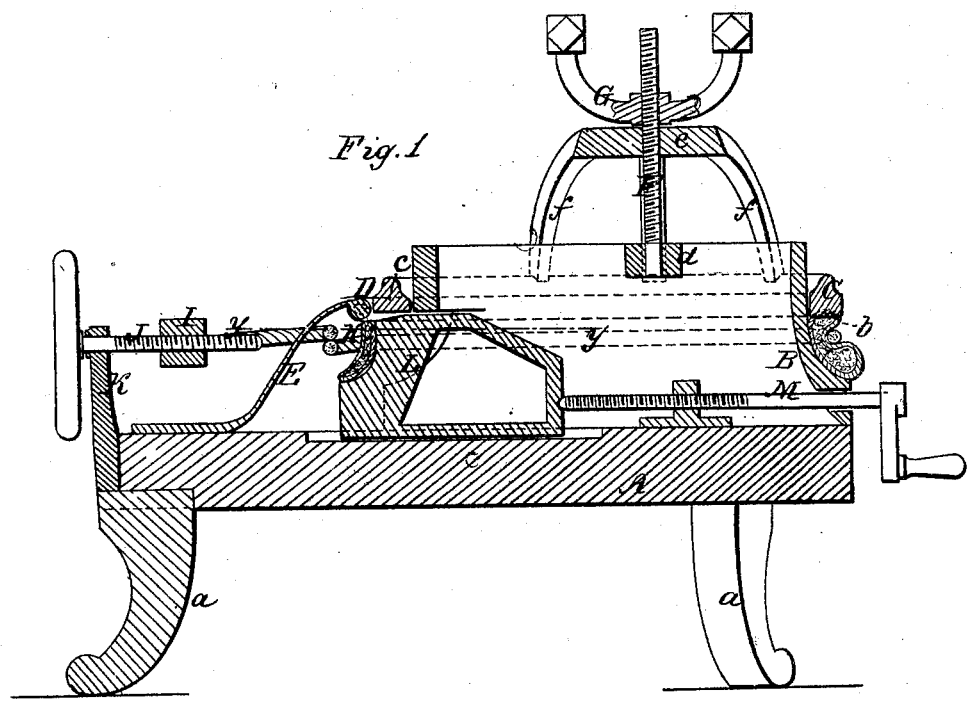
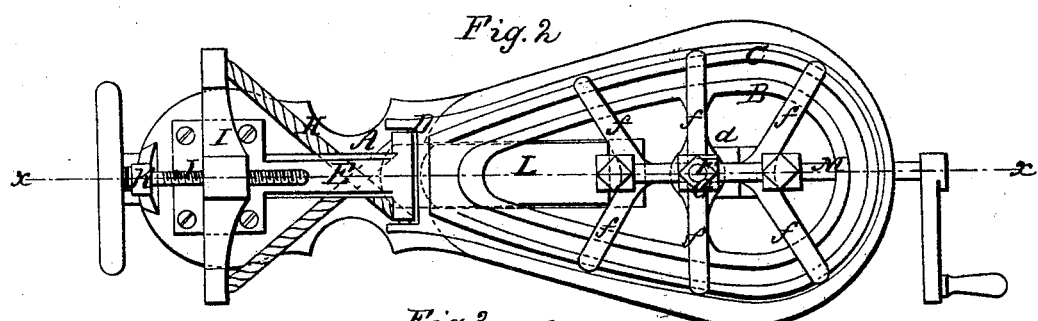
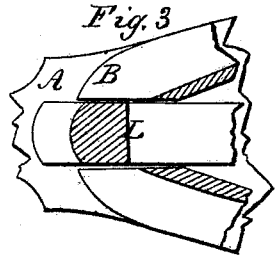
Witnesses
Harry Morris
Wm. F. McNamara
Inventor
B. W. McClure
per Munn & Co.
att'ys

UNITED STATES PATENT OFFICE.

B. W. McCLURE, OF WYOMING, IOWA.

IMPROVED HORSE-COLLAR BLOCK.

Specification forming part of Letters Patent No. 44,642, dated October 11, 1864.

*To all whom it may concern:*

Be it known that I, B. W. McCLURE, of Wyoming, in the county of Jones and State of Iowa, have invented a new and Improved Horse-Collar Block; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x$ $x$, Fig. 2; Fig. 2, a plan or top view of the same; Fig. 3, a horizontal section of a portion of the same, taken in the line $y$ $y$, Fig. 1.

Similar letters of reference indicate like parts.

This invention relates to certain improvements in a horse-collar block which was patented by myself and George Marsh, August 24, 1858.

The within-described invention consists in an improved arrangement of what is technically termed the "hame-cord," by which the groove in the collar to receive the hames is made in a more perfect manner than hitherto.

The invention also relates to an improvement in the "rim-setter" and certain parts pertaining thereto, whereby the manipulation of the same is greatly facilitated.

The invention further relates to an improvement in the "stretcher," for varying the size of the collar on the block, all being constructed and arranged as hereinafter fully set forth.

A represents the frame of the machine, supported by legs $a$ or any suitable framing, and B is a mold-block, which is firmly secured on the frame A and corresponds in shape to that portion of a horse where the collar is fitted and worn.

C represents a rim setter, which corresponds in shape to the block B, the former fitting over the latter and attached at its narrowest end by a hinge or joint, D, to an elastic curved bar, E, which is secured to the frame A. This rim-setter is of concave form at its under side, as shown at $b$ in Fig. 1. This concave $b$ extends entirely around the rim-setter C, with the exception of a point at its narrow end, as shown at $c$, adjoining the hinge D, where it is perfectly flat or smooth, the object of which will be presently explained.

The mold-block B has a cross-bar, $d$, at its upper part, in which the lower end of a vertical screw-rod, F, is fitted. On this screw-rod F there is placed a bar, $e$, provided with a series of curved legs, $f$, which rest on the rim-setter C—there being three legs, $f$, projecting from each side of the bar $e$, as shown clearly in Fig. 2, the end legs $f$ having an oblique position. By this arrangement a good bearing is obtained on the rim-setter, so that the same may be subjected to a horizontal pressure and no part be liable to tip up, neither at either side or at either end. In the original machine a single arch or two legs were only employed, and the pressure of the rim-setter on the collar was very imperfect. On the upper part of the rod F, above the bar $e$, there is fitted a nut, G, by screwing down which the legs $f$ are pressed upon C.

H represents a hame-cord, the ends of which are crossed and are attached to the ends of a bar, I, through the center of which a screw, J, passes, having its bearing in the upper part of a fixed support, K, on the frame A. (See more particularly Fig. 2.)

L is a stretcher, which is a horizontal sliding bar, passing through the narrow end of the mold-block B, and operated or adjusted by a screw, M. (Shown clearly in Fig. 1.) The outer surface of the stretcher L is rounded, so as to conform to the shape of the collar at its narrow end.

The operation is as follows: The nut G is removed from the screw F, and then the bar $e$ and the rim-setter C raised up free from the mold-block B. The collar (shown in red) is then placed on the mold-block, the rim-setter C turned down over the mold-block and upon the collar, and the legs $f$ placed on the rim, the nut G being fitted on the screw-rod F. The hame-cord H is then adjusted around the collar, and by turning the screw J is made to form the groove in the collar to receive the hames, the crossing of said cord causing the groove to be formed perfectly in the narrow part of the collar. This crossing of the hame-cord is quite an essential feature of the invention. The rim-setter C being pressed down by turning the nut G a finish is given the front edge of the collar, while the latter is forced down on the mold-block and has its rear part perfectly formed or shaped. The collar is stretched to vary its size, as may be required, by turning the screw M and forcing out the stretcher L, the smooth part $c$, at the under side of the rim-setter C, admitting of this result.

The stretcher is made of considerably greater width than that of the original machine, in order that the narrow or upper part of the collar may be of a requisite width to prevent abrasion of the horse's neck.

In the original machine the rim-setter C is detached, not hinged, as in my improvement, and consequently cannot be manipulated with as great facility.

Having thus described my invention, I claim as new and desire to secure by Letters Patent—

1. The crossing of the hame-cord H, with its ends attached to an adjustable bar, I, when said cord is used in connection with the mold-block B and rim-setter C, substantially as and for the purpose herein set forth.

2. The attaching of the rim-setter C to an elastic bar E, by means of a hinge or joint, D, to admit of the ready manipulation of the rim-setter, as described.

3. The bar $e$, provided with a plurality of legs, $f$, at each side, when used in combination with the rim-setter C and mold-blocks B, for the purpose specified.

4. The enlarged stretcher L, in combination with the mold-block B and rim-setter C, all arranged substantially as and for the purpose set forth.

B. W. McCLURE.

Witnesses:
A. H. PERSONS,
JAS. A. BRONSON.